(12) United States Patent
Hsu et al.

(10) Patent No.: US 11,613,203 B2
(45) Date of Patent: *Mar. 28, 2023

(54) LIGHTING CONTROL FOR AUTONOMOUS VEHICLES

(71) Applicant: TUSIMPLE, INC., San Diego, CA (US)

(72) Inventors: Yu-Ju Hsu, Tucson, AZ (US); Xiaoling Han, San Diego, CA (US); Jay Day, Tucson, AZ (US); Jeffrey Renn, Tucson, AZ (US); Bret Vanatta, Tucson, AZ (US)

(73) Assignee: TUSIMPLE, INC., San Diego, CA (US)

(*) Notice: Subject to any disclaimer, the term of this patent is extended or adjusted under 35 U.S.C. 154(b) by 119 days.

This patent is subject to a terminal disclaimer.

(21) Appl. No.: 17/144,436

(22) Filed: Jan. 8, 2021

(65) Prior Publication Data

US 2021/0129743 A1 May 6, 2021

Related U.S. Application Data

(63) Continuation of application No. 16/661,170, filed on Oct. 23, 2019, now Pat. No. 10,889,237.

(51) Int. Cl.
| | |
|---|---|
| *B60Q 1/26* | (2006.01) |
| *B60Q 1/08* | (2006.01) |
| *H05B 45/10* | (2020.01) |
| *H05B 47/18* | (2020.01) |
| *B60Q 1/34* | (2006.01) |
| *B60Q 1/22* | (2006.01) |

(52) U.S. Cl.
CPC ............ *B60Q 1/26* (2013.01); *B60Q 1/085* (2013.01); *B60Q 1/22* (2013.01); *B60Q 1/34* (2013.01); *H05B 45/10* (2020.01); *H05B 47/18* (2020.01)

(58) Field of Classification Search
CPC . B60Q 1/26; B60Q 1/085; B60Q 1/22; B60Q 1/34; B60Q 1/04; B60Q 1/20; B60Q 1/30; B60Q 1/44; B60Q 9/00; B60Q 3/80; H05B 45/10; H05B 47/18; H05B 47/105; H05B 47/10; B60K 37/06; B60K 37/02; B60K 35/00; B60R 16/0207
See application file for complete search history.

(56) References Cited

U.S. PATENT DOCUMENTS 7,307,621 B2 * 12/2007 Stivers ................... G09G 5/006
345/172
9,307,621 B1    4/2016 Parello et al.
(Continued)

*Primary Examiner* — Raymond R Chai
(74) *Attorney, Agent, or Firm* — Paul Liu; Julie J. Muyco; Perkins Coie, LLP

(57) ABSTRACT

Devices, systems and methods for controlling an exterior and dashboard lights of an autonomous vehicle are described. One example of a method for controlling one or more exterior lights includes receiving, from an autonomous driving system (ADS) of the vehicle, an input to control one or more exterior lights that are part of a lighting system of the vehicle, and transmitting, based on the input, a message to a controller area network (CAN) bus of the lighting system, the message being further based on a driver command upon a determination that a driver-initiated message is received. In an example, the lighting system of the vehicle further comprises a plurality of dashboard lights.

20 Claims, 9 Drawing Sheets

(56) References Cited

U.S. PATENT DOCUMENTS

| | | | |
|---|---|---|---|
| 2009/0174540 A1* | 7/2009 | Smith | B60Q 9/00 |
| | | | 340/465 |
| 2017/0227203 A1* | 8/2017 | Braatz | H05B 45/12 |
| 2017/0320501 A1* | 11/2017 | Li | B60K 37/06 |
| 2018/0105186 A1* | 4/2018 | Motomura | G08G 1/0112 |
| 2019/0001866 A1* | 1/2019 | Larsen | B60Q 1/0023 |
| 2019/0248346 A1* | 8/2019 | Wulf | B60T 7/20 |
| 2020/0094734 A1* | 3/2020 | King | B60Q 1/28 |
| 2020/0379462 A1* | 12/2020 | Kawamoto | B60W 50/085 |

* cited by examiner

LIGHTING CONTROL FOR AUTONOMOUS VEHICLES

CROSS-REFERENCE TO RELATED APPLICATIONS

This patent document is a continuation of and claims priority to U.S. patent application Ser. No. 16/661,170, filed Oct. 23, 2019. The entire content of the before-mentioned patent application is incorporated by reference as part of the disclosure of this document.

TECHNICAL FIELD

This document generally relates to lighting control to improve autonomous vehicular driving.

BACKGROUND

Autonomous vehicle navigation is a technology for sensing the position and movement of a vehicle and, based on the sensing, autonomously control the vehicle to navigate towards a destination. Autonomous vehicle navigation can have important applications in transportation of people, goods and services. One of the components of autonomous driving, which ensures the safety of the vehicle and its passengers, as well as people and property in the vicinity of the vehicle, is the use of exterior and dashboard lighting and its control for safety and maneuvering.

SUMMARY

Disclosed are devices, systems and methods for controlling the exterior lighting and the related dashboard status of an autonomous vehicle during autonomous operation to improve sensor perception, increase overall safety, and comply with laws and regulations related to vehicular operation. In one aspect, the disclosed technology can be used to provide a method for controlling one or more lights of a vehicle. This method includes receiving, from an autonomous driving system (ADS) of the vehicle, an input to control one or more exterior lights that are part of a lighting system of the vehicle; and transmitting, based on the input, a message to a controller area network (CAN) bus of the lighting system, the message being further based on a driver command upon a determination that a driver-initiated message is received.

In another aspect, the above-described method is embodied in the form of processor-executable code and stored in a computer-readable program medium.

In yet another aspect, a device that is configured or operable to perform the above-described method is disclosed. The device may include a processor that is programmed to implement this method.

The above and other aspects and features of the disclosed technology are described in greater detail in the drawings, the description and the claims.

DETAILED DESCRIPTION

The transportation industry has been undergoing considerable changes in the way technology is used to control the operation of the vehicles. As exemplified in the automotive passenger vehicle, there has been a general advancement towards shifting more of the operational and navigational decision making away from the human driving and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

These different types of autonomous vehicles have been classified into different levels of automation by under the SAE International's J3016 standard, ranging from Level 0 in which the vehicle has no automation to Level 4 (L4), which is characterized by the vehicle operating without human input or oversight but only under select conditions defined by factors such as road type or geographic area. In order to achieve L4 autonomy, all the exterior/dashboard lighting of the vehicle must be controllable by the autonomous driving system (ADS) and must also be cognizant of any driver actions or inputs.

Section headings are used in the present document to improve readability of the description and do not in any way limit the discussion or the embodiments (and/or implementations) to the respective sections only.

Examples of a Controlling an Exterior and Dashboard Lights

Figure 1B:
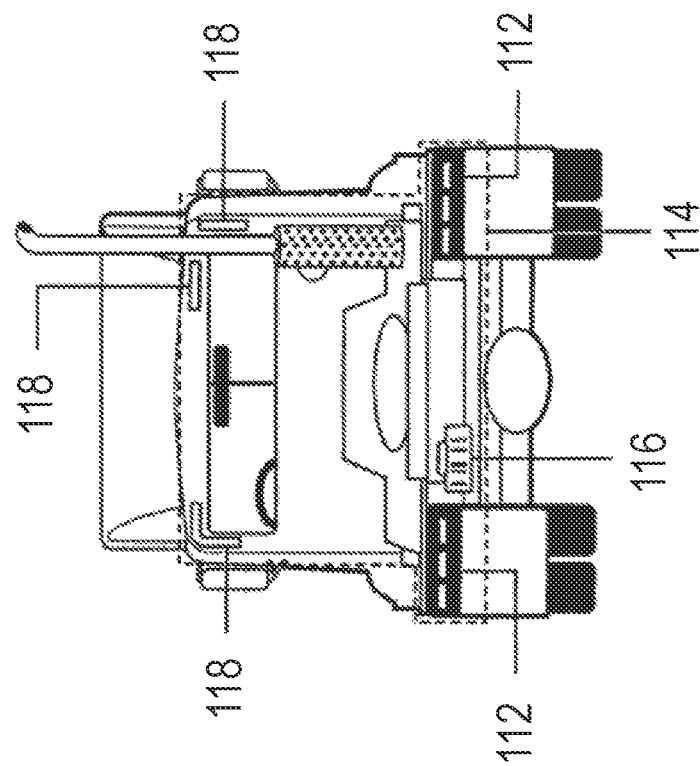
FIGS. 1A and 1B show examples of exterior lights of a truck cab.
Figure 1A:
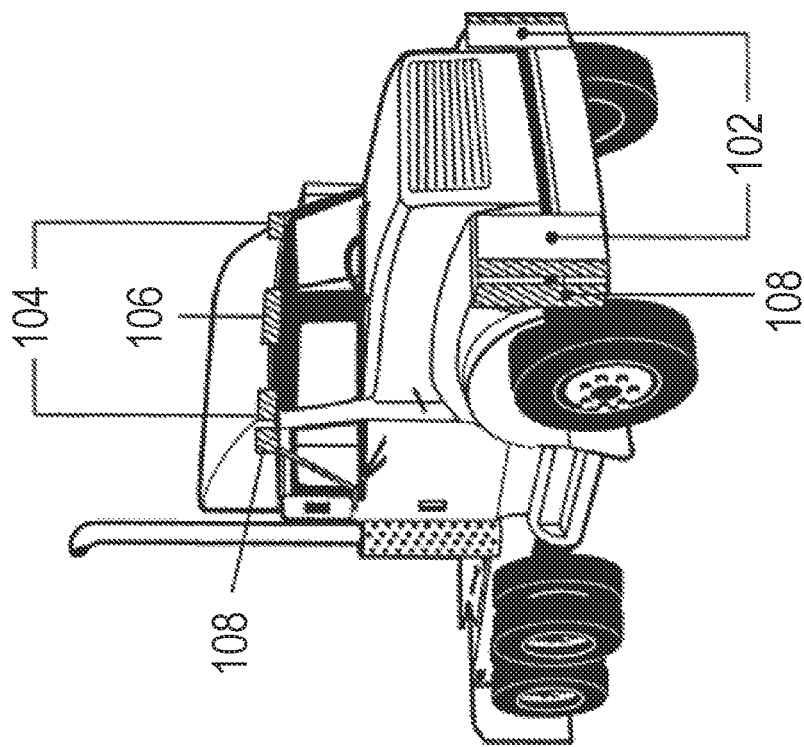

FIGS. 1A and 1B show examples of exterior lights of a truck cab, which must be controlled by the autonomous driving system (ADS) and the human driver to ensure the safety of any passengers and other pedestrians and drivers in the vicinity, ensure sensor perception and adhere to vehicular laws and regulations. In some embodiments, and as shown in FIG. 1A, the exterior lights include upper and lower beams (headlamps) (102), front clearance lamps (104), front identification lamps (106) and front side marker lamps and reflex reflectors (108). In other embodiments, and as shown in FIG. 1B, the exterior lights may further include tail lamps, stop lamps and rear turn signals (112), backup lamps (114), license plate lamps (116) and rear upper body marking and lights (118).

In yet other embodiments, the exterior lights may include one or more of low beams, high beams, fog lights, tractor marker lights, running lights, turn signal lights, hazard lights, reverse lights and/or brake lights.

Figure 1C:
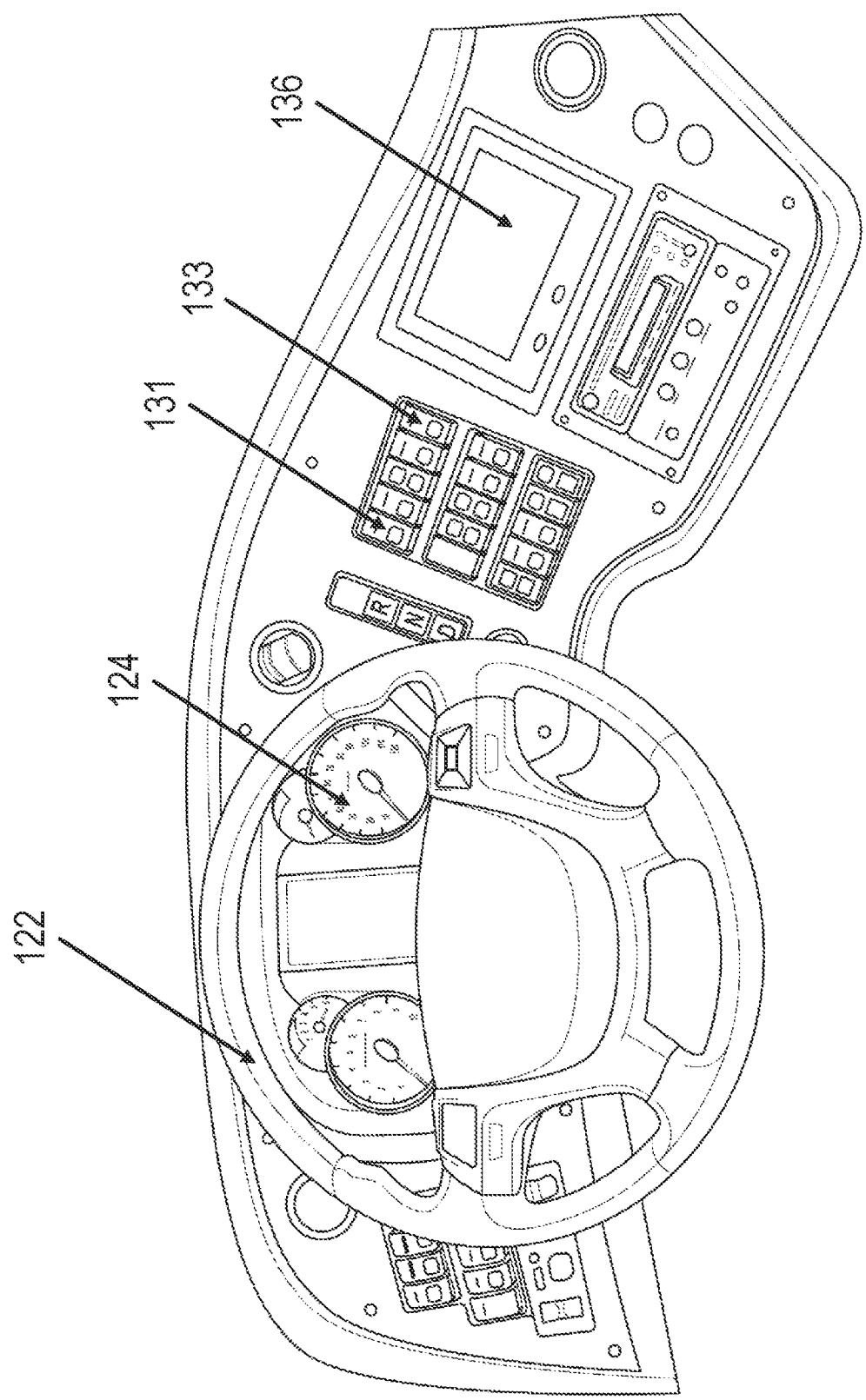
FIG. 1C shows an example of a dashboard, and dashboard lights, of a truck cab.

FIG. 1C shows an example of a dashboard, and dashboard lights, of a truck cab. As shown therein, the dashboard comprises a steering wheel (122), one or more gauges or dials (e.g., speedometer 124), one or more dashboard lights (e.g., 131 and 133) and a screen (136) that displays status and/or entertainment information. In an example, the screen (136) may be used to provide indications of dashboard and vehicular functionality. In another example, the screen (which may be a touchscreen) may be used as part of an infotainment system.

Embodiments of the disclosed technology are directed to controlling the exterior and dashboard lights of a vehicle during autonomous operation. Advantages and features of some embodiments, amongst other advantages and benefits, include:

Being aware of the intention of the driver. For example, any lighting command issued by the driver will take precedence over the commands generated by the ADS. In one case, the driver command may replace the pre-programmed ADS commands (e.g., driver signals to turn left instead of displaying the right turn signal which was programmed by the ADS), whereas in another case, the driver command may be executed in the middle of the ADS exterior and dashboard lighting control program (e.g., driver flashes high beams once to warn alert another driver in the midst of the ADS displaying the a turn signal when preparing to turn).

Figure 6A:
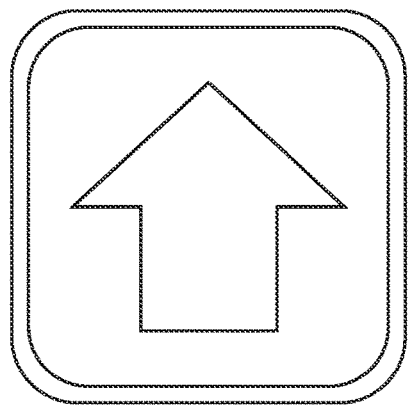
FIGS. 6A, 6B and 6C show examples of dashboard light states, in accordance with embodiments of the disclosed technology.
Figure 6C:
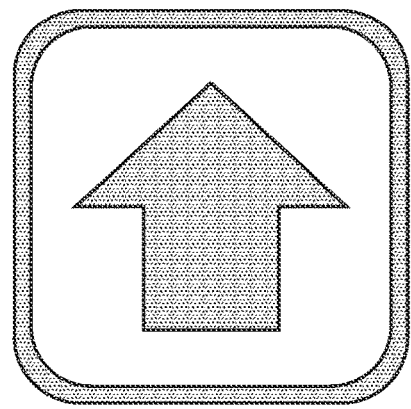
Figure 6B:
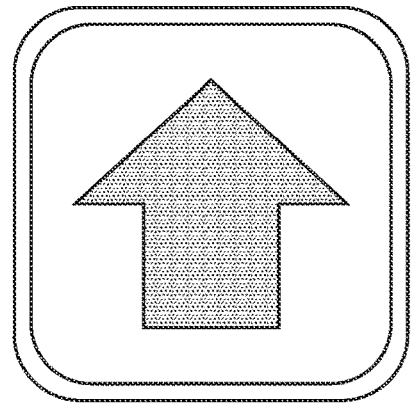

Notifying the safety operator behind the wheel through the dashboard when the system is executing ADS's lighting command (further detailed in FIGS. 6A-6C).

Resolving conflicts between ADS and driver. In general, embodiments of the disclosed technology are configured to override ADS lighting commands with any driver-issued lighting commands. In some embodiments, explicit conflict resolution mechanisms are designed to ensure that driver-issued commands take precedence while the ADS exterior and dashboard lighting control program, which is integral to the operation of the overall goal of the autonomously driven vehicle, is followed.

Operating in "silent" mode. In some embodiments, when the vehicle is being entirely controlled by the driver (e.g., L0 autonomy, or no autonomy), the ADS simply relays the driver commands to the exterior and dashboard lighting system.

Performing a security check. In some embodiments, the integrity of the control system of the exterior and dashboard lighting system components (e.g., the left turn signal light/beam) are verified by ensuring that messages generated by either the driver or the ADS are received by the component that is the intended recipient of the message, and that the message (or signal) is executed prior to the corresponding action being performed by the autonomous vehicle. In an example, the ADS may intend to turn left and issue an instruction to turn on the left turn signal. The disclosed embodiments may then verify that the left turn signal has received the instruction and has started functioning prior the ADS executing the actual left turn.

Performing a road operation safety check. In some embodiments, the physical operation of the exterior and dashboard lights can be verified prior to the corresponding action being performed by the autonomous vehicle. For example, after issuing an instruction to turn on the right turn signal, a current sensor attached to the light bulb of the right turn signal is used to validate its operating condition.

Implementing a fail-safe strategy. In some embodiments, when a primary function of a component of the exterior and dashboard lighting system is not available or not operating properly (e.g., failure of hazard lights), one or more backup components can be activated (e.g., flash low beams to indicate vehicle location in the absence of hazard lights).

The following embodiments of the disclosed technology have different configurations that are directed to achieving one or more of the advantages described above.

Embodiments Including a Parallel CAN Architecture

Figure 2:
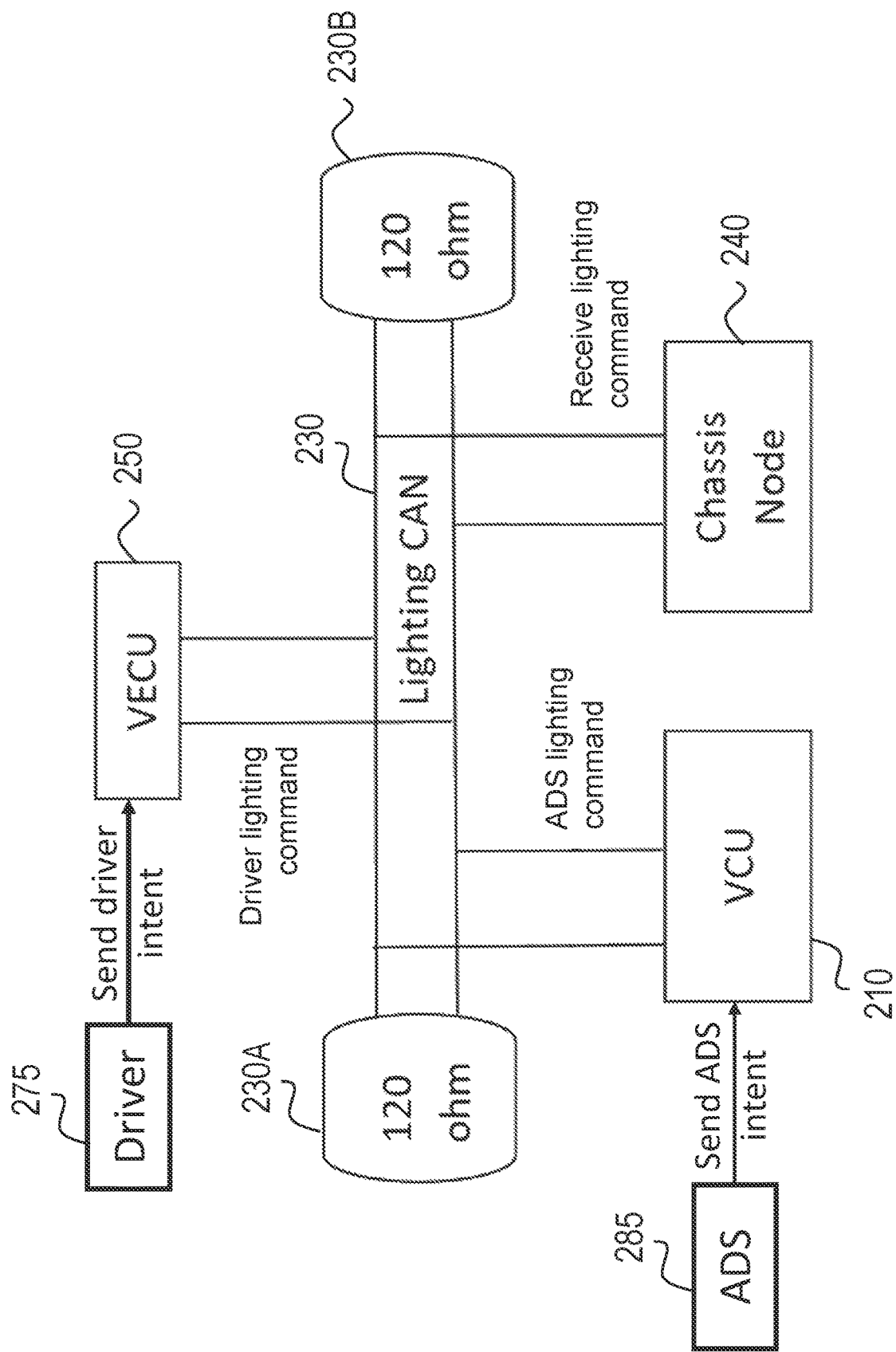
FIG. 2 is a block diagram of an example architecture of a system to control exterior and dashboard lights, in accordance with embodiments of the disclosed technology.

FIG. 2 is a block diagram of an example parallel CAN architecture to control an exterior and dashboard lighting system, in accordance with embodiments of the disclosed technology. As shown therein, a vehicle control unit (VCU) 210 is connected to a lighting controller area network (CAN) 230. In some embodiments, the VCU 210 transmits ADS lighting commands (received from the ADS 285) directly to the lighting CAN 230. In some embodiments, the vehicle electronic control unit (VECU) 250 is connected to the lighting CAN 230 and transmits the driver lighting commands (received from the driver 275) to the lighting CAN. In an example, and as shown in FIG. 2, the lighting CAN may be a J1939 data link with two 120Ω resistors (230A, 230B) to terminate the data link.

The parallel CAN architecture shown in FIG. 2 further includes a chassis node 240, which receives the lighting commands from the lighting CAN 230. In some embodiments, the chassis node 240 controls lighting functions. In an example, the chassis node 240 can be configured to operate, upon receiving the lighting commands from the ADS and/or the driver, within specific current limits for the headlamps, fog lamps, stop/turn signal lamps, trailer turn signal lamps and vehicle forward side facing turn signal lamps. In some embodiments, the chassis node 240 may be further configured to default to a protection mode if the current limits for any of the circuits are exceeded (e.g., due to installing too many lamps on a circuit or using bulbs of excessive wattage). In the default protection mode, the chassis node will ensure that some lamps do not function (to prevent the devices from being compromised due to excessive currents), but still provide sufficient lighting for safe operation of the vehicle.

As shown in FIG. 2, the VCU 210 communicates directly with the lighting CAN 230 and controls the exterior and/or dashboard lighting via this direct coupling. The parallel CAN architecture shown in FIG. 2 is easy to set up and maintain since the VCU 210 is set up in parallel with the VECU 250. However, this parallel architecture may result in conflicting messages being simultaneously sent to the lighting CAN 230 from the ADS (via VCU 210) and the driver (via VECU 250).

For example, the VCU 210 may send a command to turn on the right turn signal based on a predetermined route established by the ADS, whereas the VECU 250 may send a driver-issued command to turn on the left turn signal because the driver may have noticed that the right turn is stopped further up ahead due to construction (which may be visible to the driver, but not to the sensors of the autonomous vehicle). As discussed previously, the driver-initiated right turn signal will take precedence and be a priority.

Thus, the parallel CAN architecture shown in FIG. 2 accepts possible messaging conflicts for minimal complexity in setup and maintenance.

Embodiments Including a Series CAN Architecture

Figure 3:
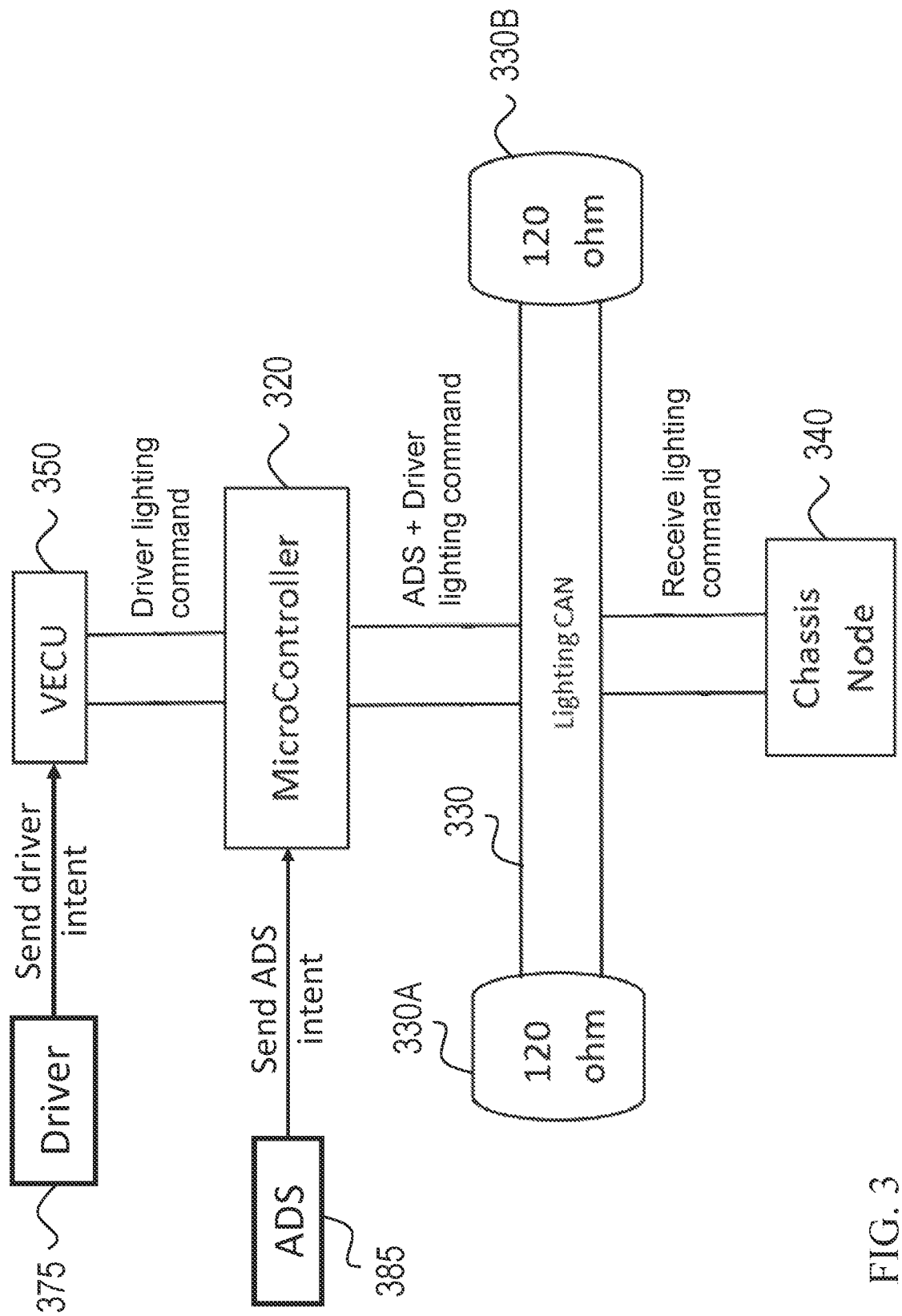
FIG. 3 is a block diagram of another example architecture of a system to control exterior and dashboard lights, in accordance with embodiments of the disclosed technology.

FIG. 3 is a block diagram of an example series CAN architecture to control an exterior and dashboard lighting system, in accordance with embodiments of the disclosed technology. This example includes some features and/or components that are similar to those shown in FIG. 2 and described above. At least some of these features and/or operations may not be separately described in this section. As shown in FIG. 3, a microcontroller 320 is inserted (in series) in between the VECU 350 and the lighting CAN 330. The lighting CAN 330 is coupled to the chassis node 340.

In some embodiments, the microcontroller 320 generates exterior and/or dashboard lighting control messages based on inputs from the ADS 385 and receives driver-initiated commands (from the driver 375) via the VECU 350. Since the microcontroller 320 receives both the ADS and driver-initiated commands, it can advantageously resolve any conflicts and thus the lighting CAN 330 never receives any conflicting messaging. However, eliminating messaging conflicts comes at the expense of a more complicated wiring design that requires the microcontroller 320 to be spliced into the existing wiring and component framework.

In some embodiments, when the ADS is not operating and the vehicle is controlled by the driver (e.g., L0 autonomy, or no autonomy), the microcontroller 320 simply serves as a relay between the VECU 350 and the lighting CAN 330.

Thus, the series CAN architecture shown in FIG. 3 accepts increased complexity in setup and maintenance in order to eliminate conflicting messages reaching the lighting CAN 330. This is in contrast to the parallel CAN architecture shown in FIG. 2, which accepts possible conflicting messages reaching the lighting CAN to enable simple setup and maintenance.

Embodiments Including a Dual-CAN Interface Architecture

Figure 4:
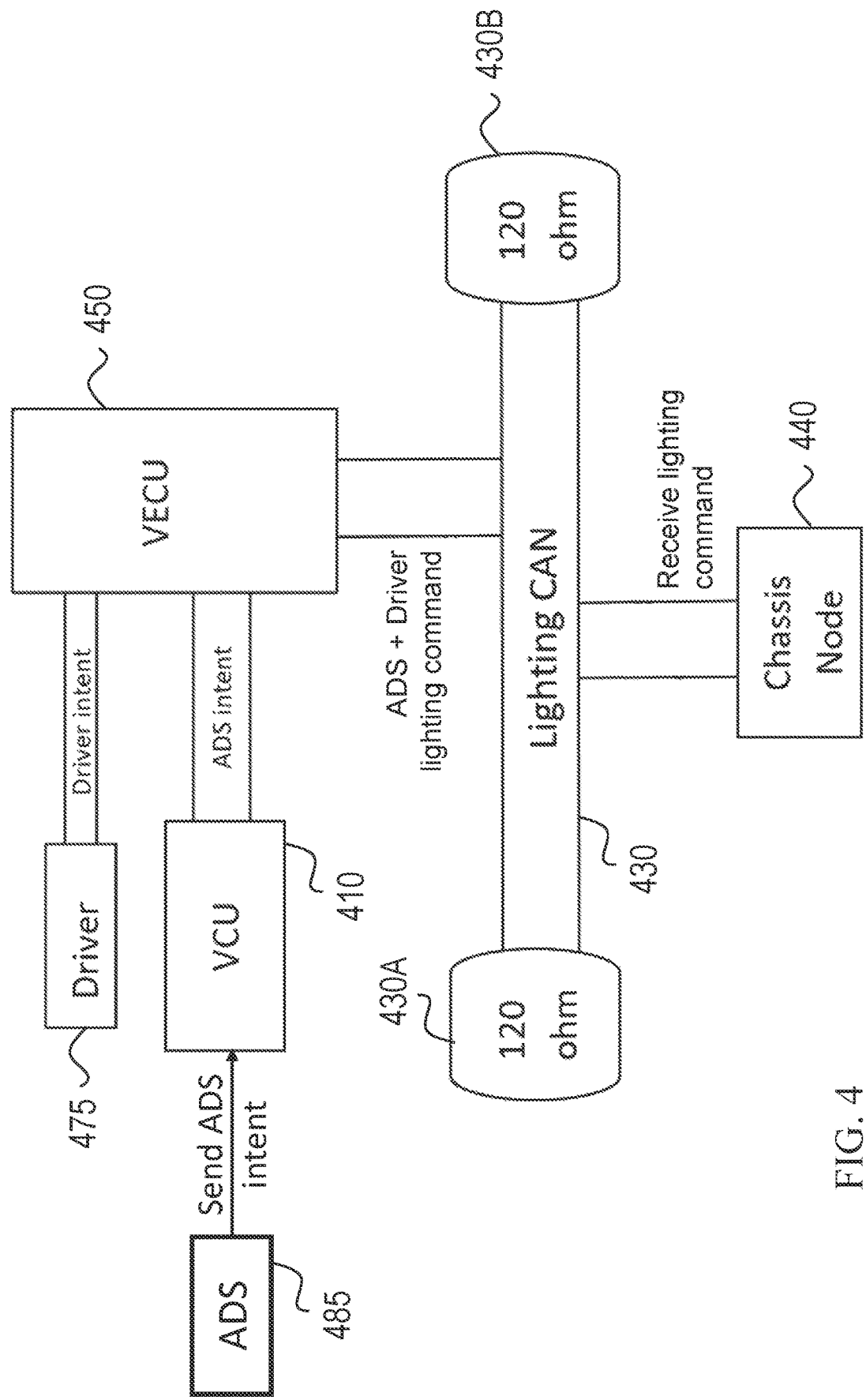
FIG. 4 is a block diagram of yet another example architecture of a system to control exterior and dashboard lights, in accordance with embodiments of the disclosed technology.

FIG. 4 is a block diagram of an example dual-CAN interface architecture to control an exterior and dashboard lighting system, in accordance with embodiments of the disclosed technology. This example includes some features and/or components that are similar to those shown in FIGS. 2 and 3 described above. At least some of these features and/or operations may not be separately described in this section.

As shown in FIG. 4, the dual CAN interface architecture is configured so that the driver 475 and the VCU 410 communicate in parallel with the VECU 450. In this embodiment, the VECU 450 performs and resolves any conflicting messages it receives from the driver 475 and the VCU 410 (which receives messages from the ADS 485). For an example, two messages may be received simultaneously (e.g., within the upper layer processing time of a message, or the second message may be received while the first message is being transmitted to the lighting CAN 430, which incurs at most a 1 milliseconds delay). For another example, the second message may be received while the commands in the first message are being executed. In these examples, the VECU 450 is configured to resolve any message conflicts, and as described above, in favor of the driver-initiated commands.

In some embodiments, the dual-CAN interface architecture can advantageously be installed without any physical alternations but except for software changes to the original VECU exterior and dashboard lighting control device and/or ADS. In an example, the VECU is a Peterbilt VECU. For example, the lighting CAN 430 does not need to be modified in any way to support the architecture shown in FIG. 4. Thus, this embodiment eliminates conflicting messages reaching the lighting CAN 430 while remaining simple to setup and maintain.

The various architectures described in the context of FIGS. 2-4 advantageously enable the integration of a custom component to control the exterior and dashboard lighting system into an existing commercial vehicle or framework. Typically, the existing architecture of commercial vehicles cannot be easily upgraded or modified on a piece-by-piece basis, but embodiments of the disclosed technology are able to support this addition while trading off complexity (of setup and maintenance) for robustness (with conflicting messages decreasing robustness). Control of the exterior and dashboard lighting system of a vehicle, which is vital to ensuring the safety of any passengers and other pedestrians and drivers in the vicinity, can be integrated into a commercial vehicle using the various embodiments described herein.

Figure 5:
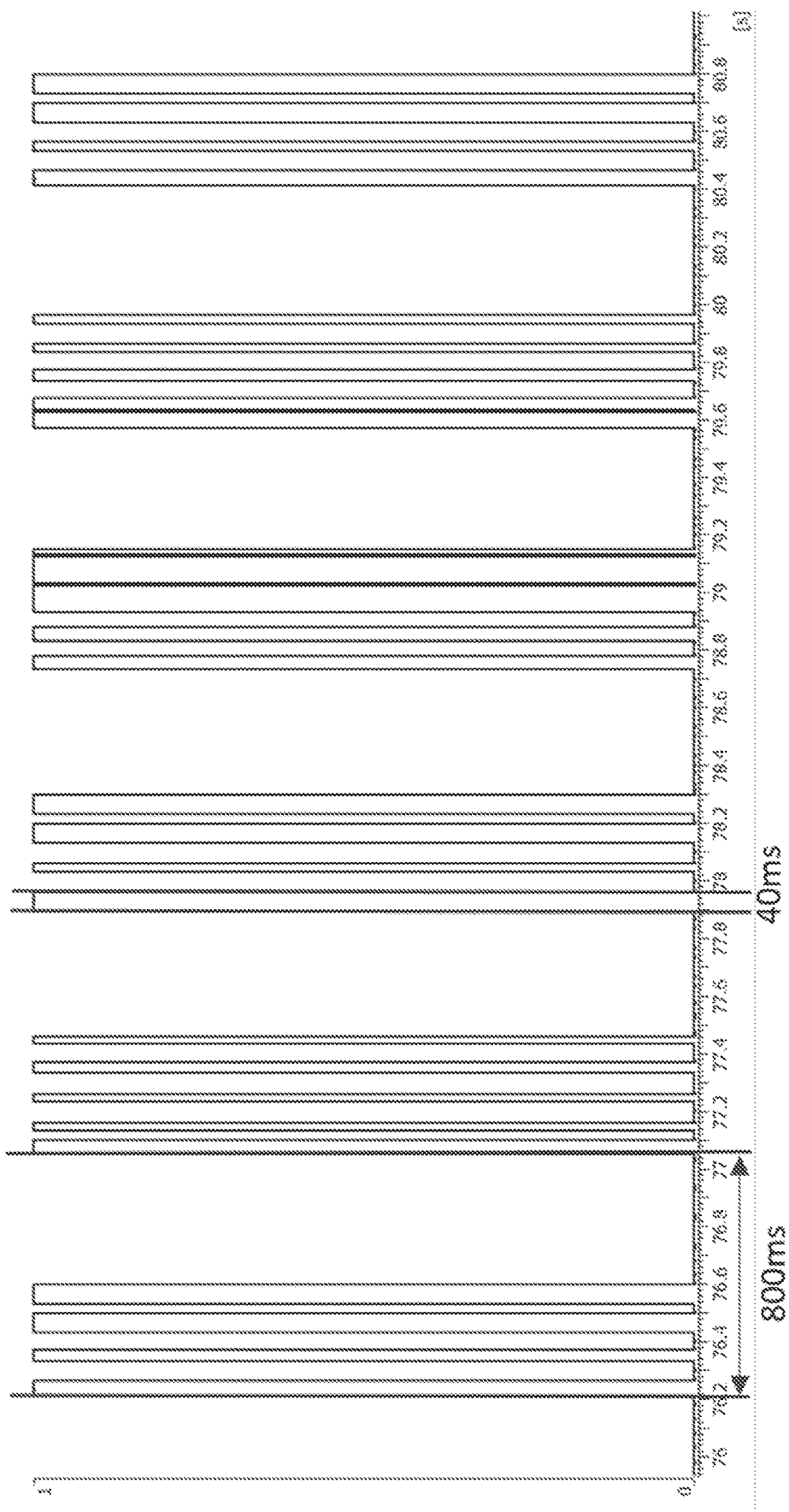
FIG. 5 shows an example of a timing diagram for control of exterior and dashboard lights, in accordance with embodiments of the disclosed technology.

In some embodiments, one or more of the architectures described in FIGS. 2-4 is calibrated to mimic, or emulate, the manufacturer-specified signaling for components of the exterior and dashboard lighting system (e.g., shown in FIGS. 1A, 1B and 1C). FIG. 5 shows an example of a timing diagram for control of an exterior light (e.g., the right turn signal), which can be used to calibrate embodiments of presently disclosed technology. The baseline lighting signal shown in FIG. 5 is active every 800 milliseconds (cycle period) with an "on" rate of 40 milliseconds within each cycle. This information may be used to calibrate the ADS to send commands and signals that mimic the baseline signal, which ensures that ADS operation remains seamless when compared to a driver operating and maneuvering the vehicle.

FIGS. 6A, 6B and 6C show examples of dashboard light states, in accordance with embodiments of the disclosed technology. FIG. 6A shows an example of a right turn signal that is completely off, whereas FIGS. 6B and 6C show the right turn signal when activated by the driver and the ADS, respectively. As shown in FIG. 6B, only the right arrow icon is activated when the driver initiates the right turn signal. As shown in FIG. 6C, both the right arrow icon and the surrounding box are activated (e.g., flashing a rate as described in FIG. 5) when the ADS initiates the right turn signal. In this manner, the driver or supervisor in the truck cab is able to easily discern the intent of the right turn, i.e., whether it was initiated by the driver or the ADS.

Visual distinctions, similar to those shown in FIGS. 6B and 6C, are envisioned by the embodiments described herein to enable the driver or supervisor to discern between driver intent and ADS intent. For example, the right turn icon may flash at different rates or different colors.

Exemplary Embodiments of the Disclosed Technology

Figure 7:
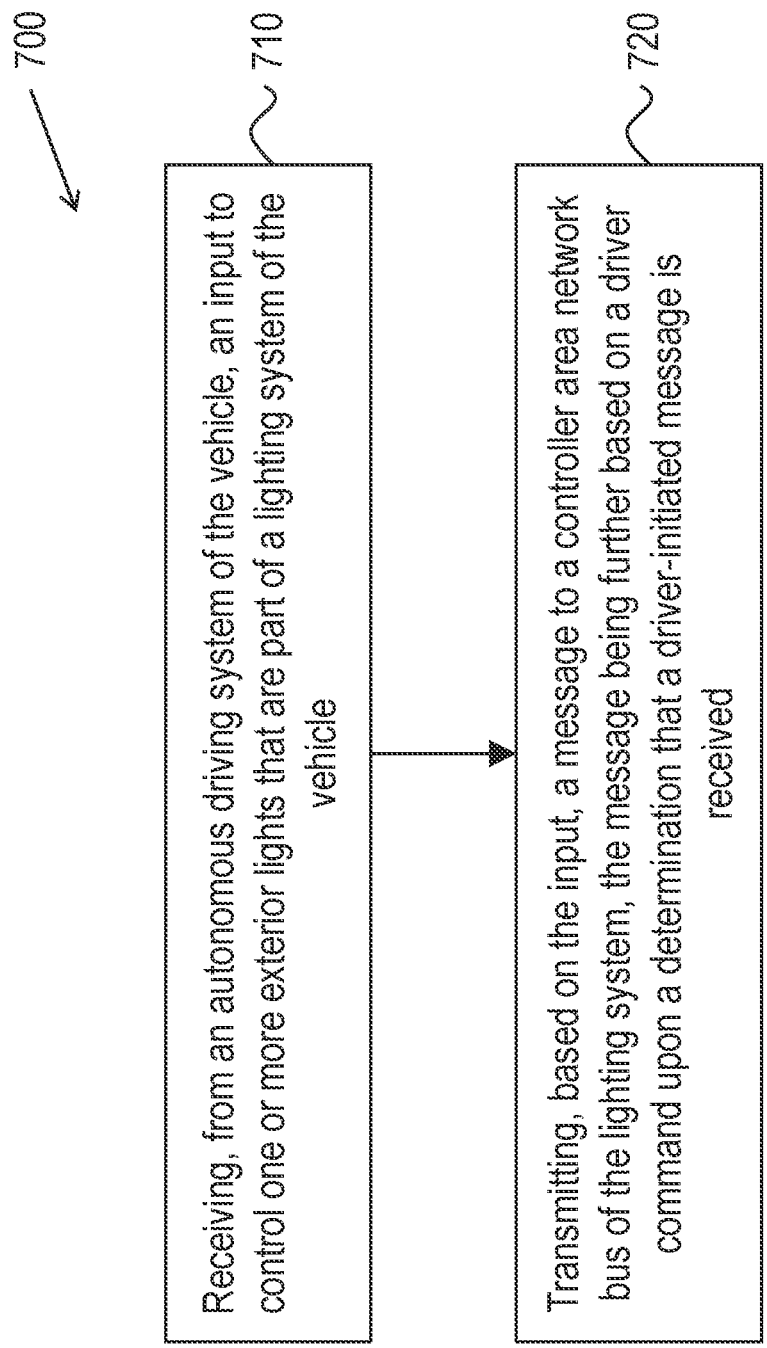
FIG. 7 shows a flowchart of an example method for controlling exterior lights, in accordance with embodiments of the disclosed technology.

FIG. 7 shows a flowchart for an example method 700 for controlling a lighting system of an autonomous vehicle. The method 700 includes, at operation 710, receiving, from an autonomous driving system (ADS) of the vehicle, an input to control one or more exterior lights that are part of a lighting system of the vehicle.

The method 700 includes, at operation 720, transmitting, based on the input, a message to a controller area network (CAN) bus of the lighting system, the message being further based on a driver command upon a determination that a driver-initiated message is received.

In some embodiments, the lighting system of the vehicle further comprises a plurality of dashboard lights.

In some embodiments, the receiving is implemented in a vehicle control unit (VCU) or a microcontroller.

In some embodiments, the one or more exterior lights comprises at least one of a low beam, a high beam, a fog light, a tractor marker light, a running light, a turn signal light, a hazard light, a reverse light or a brake light.

In some embodiments, the message is intended for a first exterior light or a first dashboard light of the lighting system, and the method 700 further comprises the operation of performing, prior to the transmitting, an integrity test that verifies a signal path from a source of the transmitting to the first exterior light or the first dashboard light.

In some embodiments, the method 700 further comprises the operation of performing, prior to the transmitting, a verification operation that checks at least one electrical connection connected to the first exterior light or the first dashboard light.

In some embodiments, the method 700 further comprises the operation of performing, prior to the receiving, a calibration operation that generates the message to control the one or more exterior lights in accordance with a manufacturer specification.

Embodiments of the disclosed technology include, in the context of FIG. 2, an apparatus for controlling one or more lights of a vehicle, comprising a lighting controller area network (CAN) configured to receive an at least one autonomous driving system (ADS) message; a vehicle electronic control unit (VECU), coupled to the lighting CAN, configured receive a driver-initiated message; a chassis node, coupled to the lighting CAN, configured to control one or more exterior lights of the vehicle based on at the least one ADS message or the driver-initiated message; and a vehicle control unit (VCU), coupled to the lighting CAN in parallel with the VECU, configured to receive an input from the ADS and generated, based on the input, the ADS message.

In some embodiments, the lighting CAN is further configured to receive the ADS message; and perform a conflict resolution between a first command in the driver-initiated message and a second command in the ADS message.

Embodiments of the disclosed technology include, in the context of FIG. 3, an apparatus for controlling one or more lights of a vehicle, comprising a lighting controller area network (CAN) configured to receive an at least one autonomous driving system (ADS) message; a vehicle electronic control unit (VECU), coupled to the lighting CAN, configured receive a driver-initiated message; a chassis node, coupled to the lighting CAN, configured to control one or more exterior lights of the vehicle based on at the least one ADS message or the driver-initiated message; and a microcontroller, coupled to the lighting CAN, configured to receive an input from the ADS and generate, based on the input, the ADS message, wherein the VECU is further configured to relay the driver-initiated message to the microcontroller, and wherein the VECU is coupled to the lighting CAN through the microcontroller.

In some embodiments, the microcontroller performs a conflict resolution between a first command in the driver-initiated message and a second command in the ADS message.

Embodiments of the disclosed technology include, in the context of FIG. 4, an apparatus for controlling one or more lights of a vehicle, comprising a lighting controller area network (CAN) configured to receive an at least one autonomous driving system (ADS) message; a vehicle electronic control unit (VECU), coupled to the lighting CAN, configured receive a driver-initiated message; a chassis node, coupled to the lighting CAN, configured to control one or more exterior lights of the vehicle based on at the least one ADS message or the driver-initiated message; a driver sub-component, coupled to the VECU, configured to relay the driver-initiated message to the VECU; and a vehicle control unit (VCU), coupled to the VECU in parallel with the driver sub-component, configured to: receive an input from the ADS, generate, based on the input, the ADS message, and transmit the ADS message to the VECU.

In some embodiments, the VECU performs a conflict resolution between a first command in the driver-initiated message and a second command in the ADS message.

Figure 8:
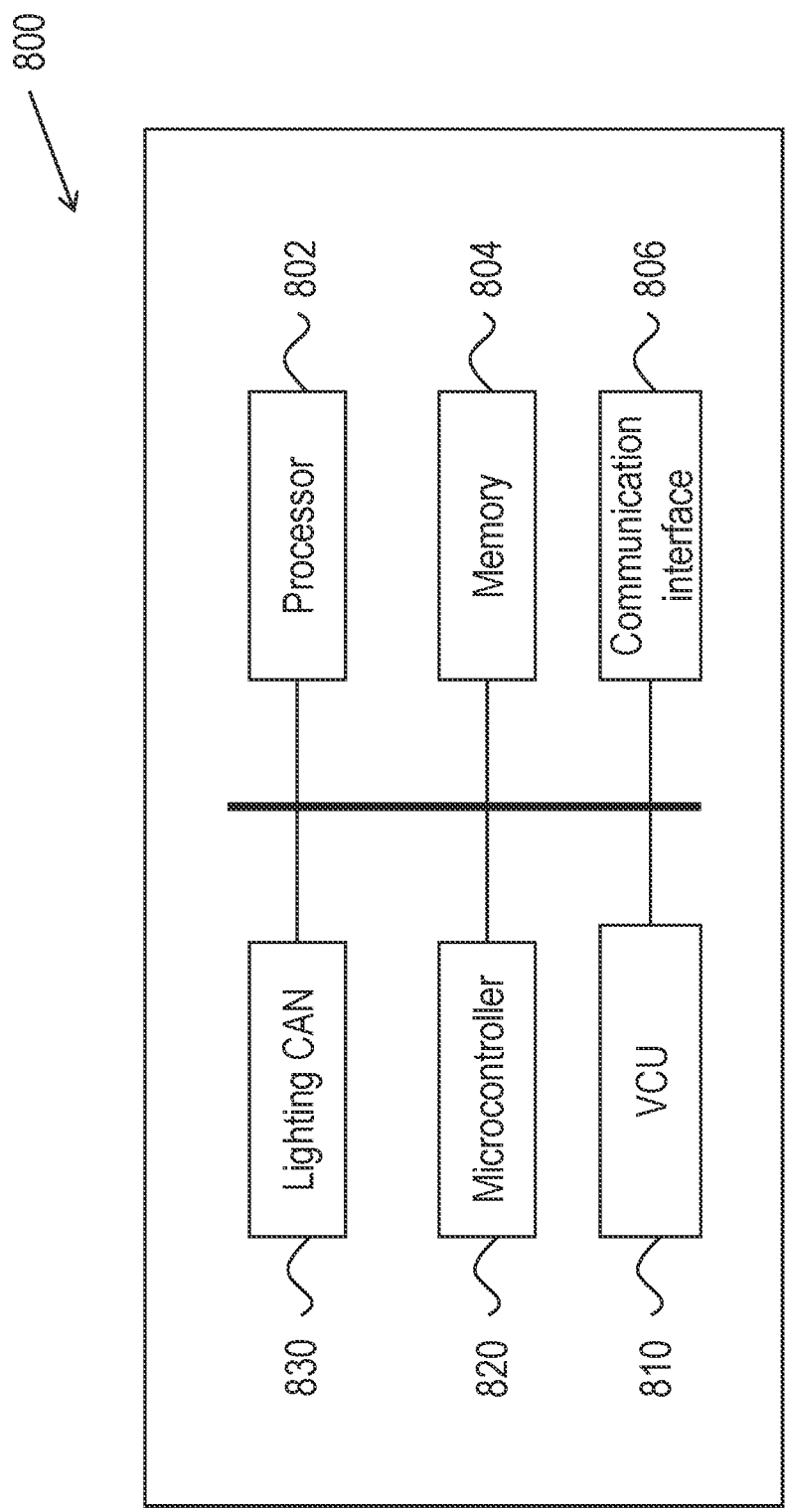
FIG. 8 shows an example of a hardware platform that can implement some techniques described in the present document.

FIG. 8 shows an example of a hardware platform 800 that can be used to implement some of the techniques described in the present document. For example, the hardware platform 800 may implement the method 700 or may implement the various modules described herein. The hardware platform 800 may include a processor 802 that can execute code to implement a method. The hardware platform 800 may include a memory 804 that may be used to store processor-executable code and/or store data. The hardware platform 800 may further include a communication interface 806. For example, the communication interface 806 may implement one or more of the communication protocols (LTE, Wi-Fi, and so on) described herein. The hardware platform may further include a VCU 810, a microcontroller 820 and a lighting CAN 830. In some embodiments, some portion or all of the VCU 810 and/or the microcontroller 820 may be implemented in the processor 802. In other embodiments, the memory 804 may comprise multiple memories, some of which are exclusively used by the VCU and/or the microcontroller.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. An apparatus for controlling lights of a vehicle, comprising:
   a lighting controller area network (CAN) configured to receive, from an autonomous driving system (ADS) of the vehicle, at least one ADS message;
   a vehicle electronic control unit (VECU), coupled to the lighting CAN, configured to receive a driver-initiated message; and
   a chassis node, coupled to the lighting CAN, configured to control, based on either the at least one ADS message or the driver-initiated message, one or more exterior lights of the vehicle and one or more dashboard lights, wherein at least one of the one or more dashboard lights comprises a visual distinction configured to enable a driver or a supervisor to discern between driver intent and ADS intent.

2. The apparatus of claim 1, wherein the chassis node is further configured to control a plurality of dashboard lights.

3. The apparatus of claim 1, further comprising:
   a vehicle control unit (VCU), coupled to the lighting CAN in parallel with the VECU, configured to receive an input from the ADS and generate, based on the input, the at least one ADS message.

4. The apparatus of claim 3, wherein the lighting CAN is further configured to:
   receive, from the VECU, the driver-initiated message; and
   perform a conflict resolution between a first command in the driver-initiated message and a second command in the at least one ADS message.

5. The apparatus of claim 1, further comprising:
   a microcontroller, coupled to the lighting CAN, configured to receive an input from the ADS and generate, based on the input, the at least one ADS message, wherein the VECU is further configured to relay the driver-initiated message to the microcontroller, and wherein the VECU is coupled to the lighting CAN through the microcontroller.

6. The apparatus of claim 5, wherein the microcontroller performs a conflict resolution between a first command in the driver-initiated message and a second command in the at least one ADS message.

7. The apparatus of claim 1, further comprising:
   a driver sub-component, coupled to the VECU, configured to relay the driver-initiated message to the VECU; and
   a vehicle control unit (VCU), coupled to the VECU in parallel with the driver sub-component, configured to:
     receive an input from the ADS,
     generate, based on the input, the at least one ADS message, and
     transmit the at least one ADS message to the VECU.

8. The apparatus of claim 7, wherein the VECU performs a conflict resolution between a first command in the driver-initiated message and a second command in the at least one ADS message.

9. The apparatus of claim 1, wherein the one or more exterior lights comprises at least one of a low beam, a high beam, a fog light, a tractor marker light, a running light, a turn signal light, a hazard light, a reverse light or a brake light.

10. A method for controlling a lighting system of a vehicle, comprising:
    receiving, by a lighting controller area network (CAN), an autonomous driving system (ADS) message;
    receiving, from a vehicle electronic control unit (VECU), a driver-initiated message; and transmitting, to a chassis node, a control message based on either the ADS message or the driver-initiated message,
wherein the control message is based on a conflict resolution between the ADS message and the driver-initiated message,
wherein the chassis node is configured to control, based on the control message, one or more exterior lights that are part of the lighting system of the vehicle,
wherein the lighting system of the vehicle further comprises a plurality of dashboard lights, wherein the dashboard lights comprise a visual distinction configured to enable a driver or supervisor to discern between driver intent and ADS intent, and wherein the visual distinction comprises a flashing rate or a color of at least one dashboard light.

11. The method of claim 10, wherein the ADS message is received from an ADS of the vehicle via a vehicle control unit (VCU) or a microcontroller.

12. The method of claim 10, wherein the one or more exterior lights comprise at least one of a low beam, a high beam, a fog light, a tractor marker light, a running light, a turn signal light, a hazard light, a reverse light or a brake light.

13. The method of claim 10, wherein the ADS message is intended for a first exterior light or a first dashboard light of the lighting system, and wherein the method further comprises:
performing, prior to the transmitting, an integrity test that verifies a signal path from a source of the transmitting to the first exterior light or the first dashboard light.

14. The method of claim 13, further comprising:
performing, prior to the transmitting, a verification operation that checks at least one electrical connection connected to the first exterior light or the first dashboard light.

15. The method of claim 10, wherein the method further comprises:
assigning precedence to the driver-initiated message; and
generating the control message based on the driver-initiated message.

16. A non-transitory computer readable storage medium having instructions stored thereupon, the instructions, when executed by a processor, causing the processor to implement a method for controlling a lighting system of a vehicle, comprising:
instructions for receiving, by a lighting controller area network (CAN) from an autonomous driving system (ADS) of the vehicle, an ADS message;
instructions for receiving, from a vehicle electronic control unit (VECU), a driver-initiated message; and
instructions for transmitting, to a chassis node, a control message based on either the ADS message or the driver-initiated message,
wherein the chassis node is configured to control, based on the control message and within predetermined current limits, one or more exterior lights that are part of the lighting system of the vehicle,
wherein the lighting system of the vehicle further comprises at least one dashboard light, and wherein the at least one dashboard light comprises a visual distinction configured to enable a driver or supervisor to discern between driver intent and ADS intent.

17. The storage medium of claim 16, wherein the ADS message is received by the lighting CAN via a vehicle control unit (VCU) or a microcontroller.

18. The storage medium of claim 16, wherein the one or more exterior lights comprise at least one of a low beam, a high beam, a fog light, a tractor marker light, a running light, a turn signal light, a hazard light, a reverse light or a brake light.

19. The storage medium of claim 16, further comprising:
instructions for switching to a protection mode upon a determination that at least one of the predetermined current limits has been exceeded.

20. The storage medium of claim 16, wherein the visual distinction comprises a flashing rate or a color of the at least one dashboard light.

* * * * *